(12) United States Patent
Hellberg et al.

(10) Patent No.: US 8,372,336 B2
(45) Date of Patent: Feb. 12, 2013

(54) POLYMERIC CORROSION INHIBITORS

(75) Inventors: Per-Erik Hellberg, Svenshogen (SE); Natalija Gorochovceva, Hjälteby (SE)

(73) Assignee: Akzo Nobel Chemicals International B.V., Amersfoort (NL)

( * ) Notice: Subject to any disclaimer, the term of this patent is extended or adjusted under 35 U.S.C. 154(b) by 0 days.

(21) Appl. No.: 13/376,777

(22) PCT Filed: Jul. 1, 2010

(86) PCT No.: PCT/EP2010/059325
§ 371 (c)(1),
(2), (4) Date: Jan. 16, 2012

(87) PCT Pub. No.: WO2011/000895
PCT Pub. Date: Jan. 6, 2011

(65) Prior Publication Data
US 2012/0114523 A1    May 10, 2012

Related U.S. Application Data

(60) Provisional application No. 61/223,206, filed on Jul. 6, 2009.

(30) Foreign Application Priority Data

Jul. 3, 2009 (EP) .................................... 09164487

(51) Int. Cl.
*C23F 11/00* (2006.01)
(52) U.S. Cl. .......................................... 422/7; 252/390
(58) Field of Classification Search .................. 252/390; 422/7
See application file for complete search history.

(56) References Cited

U.S. PATENT DOCUMENTS

| | | | |
|---|---|---|---|
| 2,638,449 A | 5/1953 | White et al. |
| 2,689,828 A | 9/1954 | Smith et al. |
| 3,014,864 A | 12/1961 | Hughes et al. |
| 3,123,634 A | 3/1964 | Udelhofen |
| 3,762,873 A | 10/1973 | Oude Alink |
| 4,238,349 A | 12/1980 | Larsen et al. |
| 4,730,079 A | 3/1988 | Hofinger et al. |
| 4,781,730 A | 11/1988 | Stoldt et al. |
| 4,885,111 A | 12/1989 | Bose et al. |
| 5,034,444 A | 7/1991 | Yun et al. |
| 5,178,786 A | 1/1993 | Jahnke et al. |
| 5,250,225 A | 10/1993 | Oppenlaender et al. |
| 5,284,495 A | 2/1994 | Baillargeon et al. |
| 5,352,377 A | 10/1994 | Blain et al. |
| 5,385,674 A | 1/1995 | Kupfer et al. |
| 5,456,731 A | 10/1995 | Blain et al. |
| 5,582,792 A | 12/1996 | Dougherty et al. |
| 5,599,779 A | 2/1997 | Karol et al. |
| 5,710,110 A | 1/1998 | Cooperman et al. |
| 6,224,642 B1 | 5/2001 | Daly et al. |
| 2004/0102332 A1 | 5/2004 | Thompson et al. |
| 2004/0164278 A1 | 8/2004 | Dahlmann et al. |
| 2006/0135628 A1 | 6/2006 | Newman et al. |

FOREIGN PATENT DOCUMENTS

| | | |
|---|---|---|
| CA | 1336843 | 8/1995 |
| EP | 0 035 263 A2 | 9/1981 |
| EP | 0 106 234 | 5/1984 |
| EP | 192 358 A2 | 8/1986 |
| EP | 0 333 135 A2 | 9/1986 |
| EP | 0 299 348 A2 | 1/1989 |
| EP | 0 498 178 A | 8/1992 |
| EP | 0 572 881 | 12/1993 |
| EP | 0 647 768 A2 | 4/1995 |
| JP | 52-78729 | 12/1975 |
| JP | 57-151700 | 3/1981 |
| JP | 58-162697 | 3/1982 |
| JP | 58-198593 | 5/1982 |
| WO | WO 2004/099350 A1 | 11/2004 |

OTHER PUBLICATIONS

European Search Report for Application No. 09164487.2; Completion date Dec. 7, 2009.
International Search Report for PCT Application No. PCT/EP2010/059325; Completion date Sep. 20, 2010.
Bubble Test, NACE International, vol. 46, No. 5, pp. 46-51 (May 2007).
English Abstract of EP 0 035 263 A2, Sep. 1981.
English Abstract of EP 0 106 234, May 1984.
English Abstract of EP 0 299 348 A2, Jan. 1989.
English languagage of Derwent Abstract No. 58220Y/33 for JP 52-78729, Dec. 1975
English languagage of Derwent Abstract No. 91571 E/43 for JP 57-151700, Mar. 1981.
English languagage of Derwent Abstract No. 83-805476/44 for JP 58-162697, Mar. 1982.
English languagage of Derwent Abstract No. 84-002996/01 for JP 58-198593, May 1982.

*Primary Examiner* — Sean E Conley
(74) *Attorney, Agent, or Firm* — Sugiarto Hadikusumo

(57) ABSTRACT

The present invention relates to the use of a product obtainable by the reaction of an alkoxylated fatty amine with a dicarboxyhc acid derivative, followed by partial or total quaternization of the reaction product obtained; or by reacting a product with a dicarboxylic acid derivative, followed by partial or total quaternization of the reaction product obtained. The product consists of >60% w/w of oligomers/polymers with at least two alkoxylated amine units and one or more diacid/acid anhydride unit or >50% w/w of oligomers/polymers with at least two alkoxylated amine units and two or more diacid/acid anhydride units; as a corrosion inhibitor for metal surfaces. The invention also relates to a method for protecting a metal surface from corrosion by contacting the metal surface with said corrosion inhibitor.

12 Claims, No Drawings

POLYMERIC CORROSION INHIBITORS

CROSS-REFERENCES TO RELATED APPLICATIONS

This application is a National Stage entry of International Application PCT/EP2010/059325, filed Jul. 1, 2010, which claims the benefit of U.S. Patent Application No. 61/223,206, filed Jul. 6, 2009, and European Patent Application No. 09164487.2, filed Jul. 3, 2009. The contents of the aforementioned applications are incorporated herein by reference in their entireties.

FIELD OF THE INVENTION

The present invention relates to the use of a product obtainable by the reaction of an alkoxylated fatty amine with a dicarboxylic acid derivative as a corrosion inhibitor for metal surfaces. The present invention also relates to a method for protecting a metal surface from corrosion by contacting the metal surface with said corrosion inhibitor.

BACKGROUND OF THE INVENTION

Corrosion is often a serious issue in the oil and gas field processes, e.g. in transportation of crude oil, and in oil or gas wells. This could be due to dissolved gases such as carbon dioxide or hydrogen sulfide causing so-called sweet and sour corrosion, respectively, on ferrous metal surfaces. Another serious corrosion enhancer is the often high electrolyte concentration in the water which is co-produced with the oil and gas. Further, severe risks of corrosion are obvious when inorganic or organic acids are used in so-called acid stimulation or fracturing operations encountered in order to increase the productivity of oil and gas wells. In such cases, the acidified water is often viscosified by addition of a suitable thickener. Also in drilling operations there often is a need to use corrosion inhibitors, e.g. in drilling fluids. Corrosion problems are also often an issue in downstream processes such as refineries, when e.g. salts or acid components from crude oils could be the cause of ferrous metal corrosion.

Different types of nitrogen-containing compounds, such as e.g. fatty amines, alkoxylated fatty amines, amidoamines, and quarternary ammonium compounds, are well-known bases for corrosion inhibitor formulations used in various kinds of systems.

U.S. Pat. No. 5,352,377 and U.S. Pat. No. 5,456,731 disclose reaction products of hydrocarbyl-substituted carboxylic anhydrides, more specifically-hydrocarbyl substituted succinic anhydrides, and aminoalkanols, e.g. ethoxylated fatty alkyl monoamines or ethoxylated fatty alkyl propylenediamines, that can provide effective antiwear, antirust, and corrosion-inhibiting properties in lubricant and fuel applications.

U.S. Pat. No. 5,178,786 relates to corrosion-inhibiting compositions and their use in functional fluids, especially aqueous hydraulic fluids. These compositions comprise at least four components A, B, C, and D, where component D is an ester-salt formed by the reaction of an alkyl or alkenyl succinic anhydride with an alkanolamine. The preferred alkanolamines are e.g. dimethylethanolamine, diethylethanolamine, and methylethylethanolamine, and thus the preferred products D are not polymers.

There are also a number of patent publications where oligomeric/polymeric nitrogen-containing ester-linked compounds based on dicarboxylic acids/anhydrides and ethoxylated (fatty alkyl)amines are used in other applications/systems.

In EP 0 572 881 a product obtained from an oxyalkylated primary fatty amine and a dicarboxylic acid is disclosed for use in a process for separation of a petroleum emulsion of the water-in-oil type.

U.S. Pat. No. 4,781,730 discloses reaction products of a polybasic acid and a polyhydroxyalkanolamine that are components in a fuel additive composition for reduction of valve seat recession in a vehicle.

U.S. Pat. No. 5,034,444 discloses a rheological additive for non-aqueous coating compositions that may be the reaction product of an alkoxylated aliphatic nitrogen-containing compound and an organic polycarboxylic anhydride or acid.

EP 0 035 263 A2 discloses polyester compounds produced by reaction between a dicarboxylic acid and an alkoxylated tertiary amine and their use as textile softeners.

U.S. Pat. No. 5,284,495 discloses oligomers/polymers, which can be prepared by polymerising an anhydride, e.g. phthalic anhydride, and long-chain amine containing diols, e.g. ethoxylated octadecylamine. These products are used as additives which improve the low-temperature properties of distillate fuels.

U.S. Pat. No. 5,710,110 discloses a drilling fluid composition containing an oil well fluid anti-settling additive, which is a reaction product wherein the reactants are one or more alkoxylated aliphatic amino compounds and an organic polycarboxylic anhydride or acid.

Although a variety of corrosion inhibitors has been developed to be used in the presence of fresh water, seawater, or brine, there is still a need for more effective corrosion inhibitors, especially if these also can be shown to fulfil stringent regulatory requirements for environmental adaptation. Thus, there is a great need for new corrosion inhibitors with an acceptable biodegradation profile combined with a low disposition to bioaccumulation and an excellent technical performance.

SUMMARY OF THE INVENTION

It is an object of the present invention to at least partially meet the above-mentioned need in the art and to provide a corrosion-inhibiting compound that exhibits high efficacy.

It is another object of the present invention to provide corrosion-inhibiting compounds that have advantageous environmental properties.

The present inventors have found that these objects can be met by certain products obtainable by the reaction of an alkoxylated fatty amine, or a quaternized derivative of said amine, with a dicarboxylic acid or a derivative thereof. More particularly, products obtainable by the reaction of an alkoxylated fatty amine having the formula

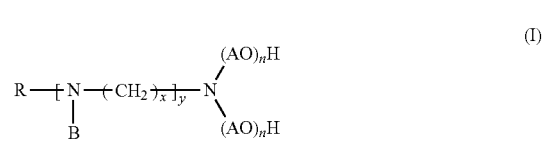

wherein R is a hydrocarbyl group having 8-24 carbon atoms, preferably 12 to 24 carbon atoms; each B is, independently, an alkyl group having 1-4 carbon atoms, a benzyl group, or the group $(AO)_nH$, wherein AO is an alkyleneoxy group containing 2-4 carbon atoms, preferably 2 carbon atoms; each n is, independently, at least 1 and the sum of all n is 2-30, preferably 2-15, more preferably 2-10, and most preferably 2-5; x is 2 or 3; and y is 0-3, preferably 0 or 1; or of a product obtainable by partial or total quaternisation of the alkoxylated fatty amine of formula (I); with a non-hydrophobic dicarboxylic acid derivative having the formula

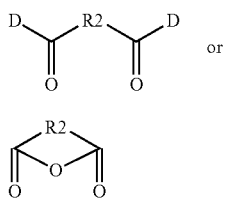

(IIa)

or (IIb)

wherein D is —OH, —Cl, or —OR3, wherein R3 is a C1-C4 alkyl group; R2 is an alkylene radical of formula —(CH$_2$)$_z$—, wherein z is an integer from 0 to 10, preferably from 0 to 6, more preferably from 2 to 4, and most preferably 2, and wherein the alkylene radical may be substituted by 1 or 2 —OH groups; the group —CH═CH—, or the o-phenylene group; optionally the reaction between the amine compound and the dicarboxylic acid derivative is followed by partial or total quaternisation; and wherein the reaction product, which is optionally quaternised, consists for more than 60% by weight (% w/w) of oligomers/polymers with two or more alkoxylated amine units (optionally quaternised) and one or more diacid/acid anhydride units and more than 50% w/w of oligomers/polymers with two or more alkoxylated amine units (optionally quaternised) and two or more diacid/acid anhydride units; are excellent corrosion inhibitors for metal surfaces. Further, the products meet the above objectives regarding environmental properties.

Thus, in a first aspect, the present invention relates to the use of the aforementioned products as corrosion inhibitors for metal surfaces.

In a further aspect, the present invention relates to a method for protecting a metal surface from corrosion by contacting the metal surface with an effective amount of a corrosion inhibitor as mentioned above.

These and other aspects of the present invention will be apparent from the following detailed description of the invention.

DETAILED DESCRIPTION OF THE INVENTION

As is mentioned above, the present invention is based on the surprising corrosion-inhibiting properties of products obtainable by the reaction of an alkoxylated fatty amine having the formula (I)

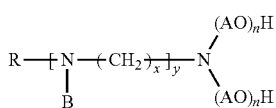

(I)

wherein R is a hydrocarbyl group having 8-24 carbon atoms, preferably 12 to 24 carbon atoms; each B is, independently, an alkyl group having 1-4 carbon atoms, a benzyl group, or the group (AO)$_n$H, wherein AO is an alkyleneoxy group containing 2-4 carbon atoms, preferably 2 carbon atoms; each n is at least 1 and the sum of all n is 2-30, preferably 2-15, more preferably 2-10, and most preferably 2-5; x is 2 or 3; and y is 0-3, preferably 0 or 1; or of a product obtainable by partial or total quaternisation of the alkoxylated fatty amine of formula (I); with a dicarboxylic acid derivative having the formula

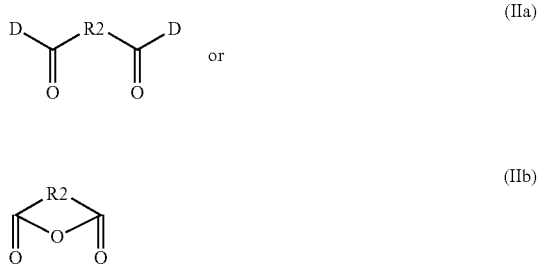

(IIa)

or (IIb)

wherein D is —OH, —Cl, or —OR3, wherein R3 is a 01-04 alkyl group; R2 is selected from the group consisting of a direct bond, an alkylene radical of formula —(CH$_2$)$_z$—, wherein z is an integer from 1 to 10, a substituted alkylene radical wherein said alkylene radical is substituted by 1 or 2 —OH groups, the group —CH═CH—, and the o-phenylene group; optionally said reaction between the amine and the dicarboxylic acid derivative is being followed by partial or total quaternisation of the reaction product obtained, wherein the product to >60% w/w consists of oligomers/polymers with at least two alkoxylated amine units and one or more diacid/acid anhydride unit and to >50% w/w of oligomers/polymers with at least two alkoxylated amine units and two or more diacid/acid anhydride units.

All of the alkoxylated fatty amines (I) contemplated for use as starting materials for the corrosion inhibitors of the present invention have ethyleneoxy and/or propyleneoxy or butyleneoxy groups included in their structures, but structures including ethyleneoxy groups are preferred. When propyleneoxy/butyleneoxy groups are present, the ethyleneoxy and propyleneoxy/butyleneoxy groups may be added in two or more blocks in either order or may be added randomly, but, if used, it is preferred to have the propyleneoxy/butyleneoxy groups closest to the nitrogen atom.

In one embodiment compound (I) is an alkoxylated fatty monoamine having the formula

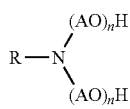

wherein R, AO, and n have the same meaning as above.

In another embodiment (I) is an alkoxylated diamine having the formula

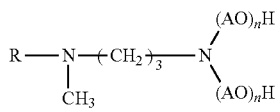

wherein R, AO, and n have the same meaning as above in general formula (I).

In still another embodiment (I) is another alkoxylated diamine having the formula

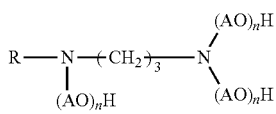

wherein R, AO, and n have the same meaning as above in general formula (I).

Compounds of formula I, wherein all, or essentially all, of the AO groups each represent an ethyleneoxy group, ($CH_2CH_2O$), are especially preferred.

In further embodiments the amine compounds of formula (I) may be quaternised in a conventional way by reaction with an alkylating agent, e.g. methyl chloride or dimethyl sulphate, before reaction with a dicarboxylic acid derivative (IIa) or (IIb). Either a part of, or all of, the nitrogen atoms may be quaternised. A further embodiment, if a quaternised derivative is desired, relates to a reaction product between the tertiary compound (I) and a dicarboxylic acid derivative (IIa) or (IIb), which is subsequently reacted with an alkylating agent, e.g. methyl chloride or dimethyl sulphate, to yield a product that is partly or totally quaternised. If desired, it is also possible to use both quaternization steps, such that a partially quaternised amine of formula I is reacted with a diacid after which the resulting product is further quaternised, optionally until it is fully quaternised.

Illustrative examples of suitable fatty amines for use as starting materials for the alkoxylated fatty amines include, but are not limited to, (fatty alkyl)monoamines according to formula $R1NH_2$, wherein R1 is an aliphatic group having 8-24, preferably 12-24 carbon atoms; (fatty alkyl)diamines according to formula $R2NHCH_2CH_2CH_2NH_2$, wherein R2 is an aliphatic group having 8-24, preferably 12-24 carbon atoms; linear (fatty alkyl)triamines according to formula $R3NHCH_2CH_2CH_2NHCH_2CH_2CH_2NH_2$, wherein R3 is an aliphatic group having 8-24, preferably 12-24 carbon atoms; and linear (fatty alkyl)tetramines according to formula $R4NHCH_2CH_2CH_2NHCH_2CH_2CH_2NHCH_2CH_2CH_2NH_2$, wherein R4 is an aliphatic group having 8-24, preferably 12-24 carbon atoms. More specific examples of the above-mentioned amines include, but are not limited to, 2-ethylhexyl amine, 2-propylheptyl amine, n-octyl amine, n-decyl amine, n-dodecyl amine, (coco alkyl)amine, n-tetradecyl amine, n-hexadecyl amine, n-octadecyl amine, oleyl amine, (tallow alkyl)amine, (hydrogenated tallow alkyl)amine, (rape seed alkyl)amine, (soya alkyl)amine, erucyl amine, N-(n-decyl)-trimethylene diamine, N-(n-dodecyl)-trimethylene diamine, N-(coco alkyl)-trimethylene diamine, N-(rape seed alkyl)-trimethylene diamine, N-(soya alkyl)-trimethylene diamine, N-(tallow alkyl)-trimethylene diamine, N-(hydrogenated tallow alkyl)-trimethylene diamine, N-erucyl trimethylene diamine, N-(n-decyl)-N'-(3-aminopropyl)-1,3-propane diamine, N-(n-dodecyl)-N'-(3-aminopropyl)-1,3-propane diamine, N-(coco alkyl)-N'-(3-aminopropyl)-1,3-propane diamine, N-(rape seed alkyl)-N'-(3-aminopropyl)-1,3-propane diamine, N-(soya alkyl)-N'-(3-aminopropyl)-1,3-propane diamine, N-oleyl-N'-(3-aminopropyl)-1,3-propane diamine, N-(tallow alkyl)-N'-(3-aminopropyl)-1,3-propane diamine, N-(hydrogenated tallow alkyl)-N'-(3-aminopropyl)-1,3-propane diamine, N-erucyl-N'-(3-aminopropyl)-1,3-propane diamine, N-(3-aminopropyl)-N'-[3-(9-decylamino)propyl]-1,3-propane diamine, N-(3-aminopropyl)-N'-[3-(9-dodecylamino)propyl]-1,3-propane diamine, N-(3-aminopropyl)-N'-[3-(9-(coco alkyl)amino)propyl]-1,3-propane diamine, N-(3-aminopropyl)-N'-[3-(9-(rape seed alkyl)amino)propyl]-1,3-propane diamine, N-(3-aminopropyl)-N'-[3-(9-(soya alkyl)amino)propyl]-1,3-propane diamine, N-(3-aminopropyl)-N'-[3-(9-octadecenylamino)propyl]-1,3-propane diamine, N-(3-aminopropyl)-N'-[3-(9-(tallow alkyl)amino)propyl]-1,3-propane diamine, N-(3-aminopropyl)-N'-[3-(9-(hydrogenated tallow alkyl)amino)propyl]-1,3-propane diamine, and N-(3-aminopropyl)-N'-[3-(9-erucylamino)propyl]-1,3-propane diamine.

These fatty amines are then typically alkoxylated with 2-20 EO, 2-20 PO, 2-20 BO, blocks with EO added first and PO and/or BO last; blocks with PO and/or BO added first and EO last; and mixtures of EO and PO and/or BO to produce randomly alkoxylated products of the general formula (I).

Examples of commercial products of formula (I) ex AkzoNobel Surface Chemistry include Ethomeen C/12, Ethomeen C/15, Ethomeen C/25, Ethomeen T/12, Ethomeen T/15, Ethomeen T/20, Ethomeen T/25, Ethomeen HT/12, Ethomeen O/12, Ethomeen OV/12, Ethomeen S/12, Ethomeen S/17, Ethomeen S/22, Ethoduomeen C/13, and Ethoduomeen T/13, Ethoduomeen T/22, and Ethoduomeen T/25.

The dicarboxylic acid derivative of general formula IIa or IIb could be a dicarboxylic acid as such, a dicarboxylic acid chloride, a diester of a dicarboxylic acid, or a cyclic anhydride of a dicarboxylic acid. The alkylene radical —$(CH_2)_z$— in formula (IIa) and (IIb) may not be substituted by any alkyl or alkenyl groups. The most suitable derivatives are the dicarboxylic acids and their corresponding cyclic anhydrides. Illustrative examples of dicarboxylic acid derivatives include oxalic acid, masonic acid, succinic acid, glutaric acid, adipic acid, pimelic acid, phthalic acid, maleic acid, malic acid, tartaric acid, their corresponding acid chlorides, their corresponding methyl or ethyl esters, and their corresponding cyclic anhydrides. All the general reaction types between a compound of formula (I) and an acid derivative of formula (IIa) or (IIb) are well known in the art, and could be e.g. a direct esterification of the diacid with the compound of formula (I) or a transesterification of the diester by the compound of formula (I). These reactions will not be discussed in detail here, since such information is available in general organic chemistry handbooks.

The corrosion-inhibiting products to be used in this invention are oligomeric and/or polymeric nitrogen-containing polyesters.

An example of such oligomeric/polymeric nitrogen-containing polyesters has the formula

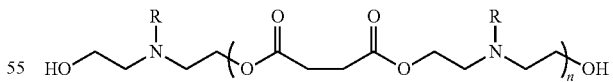

wherein R is a hydrocarbyl group having 8-24 carbon atoms, preferably 12 to 24 carbon atoms, and n is a number of at least 1, preferably at least 2, more preferably at least 3, and most preferably at least 4.

To produce a product according to the example above, where n is 5, a primary fatty alkylamine that has been ethoxylated with two moles of EO is reacted with e.g. succinic anhydride according to the scheme below. However, succinic acid or any of the other dicarboxylic acid derivatives mentioned above may equally well be used.

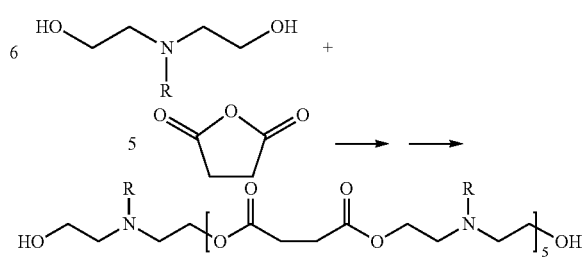

In an embodiment of the invention the molar ratio between the reactants (I) and (IIa) or (IIb) is 2:1 to 1:2, preferably 1.5:1 to 1:1.5, and most preferably 1.2:1 to 1:1.2 in order to produce suitable corrosion inhibitors.

The corrosion inhibitors of the present invention may be used for protection of metal surfaces, preferably ferrous metals or alloys, such as iron and steel, of pipelines, pumps, tanks and other equipment preferably used in oil and gas fields or refineries in all of the abovementioned situations.

With regard to the use of the polymeric amine corrosion inhibitors in various flow lines, the fluid content can vary in wide ranges, e.g. oil cuts may vary from 1% in field situations to 100% in e.g. refineries, while the composition of the possibly co-transported water can also vary a lot when it comes to e.g. dissolved solids and salts contents. For example, the vast majority of seawater has a salinity of 3.1-3.8% w/w, being on the average about 3.5% in the world's oceans, but the water in the flow lines, when present, could even have a salt content of up to 7% w/w, e.g. up to 6%, such as up to 4%. On the other hand, the water may also be fresh or brackish water with lower salt contents, for example as low as 0.3, even as low as 0.05% and down to ≦0.01; brackish water may exhibit a large variation from time to time having a salt content of about 0.05% up to about 3%. Typically, the metal surfaces to be protected are in contact with water of differing salt content, as exemplified above.

In the preferred procedure of this invention, the polymeric amine corrosion inhibitors are added to a flowing liquid which may contain both oil and water, but which preferably is not an emulsion, more preferably not a water-in-oil emulsion, at any point in a flow line upstream of the point or line that is intended to be protected. The dosage of corrosion inhibitor needed to obtain a sufficient protection varies with the application, but is suitably dosed in such an amount that the concentration at the point of protection is between 1 and 2,000 mg/kg, preferably between 1 and 500 mg/kg and most preferably between 1 and 150 mg/kg. Even though continuous dosage is the preferred use of the compounds of this invention, another possible mode is batch treatment, where the preferred dosage is between 1 and 5,000 mg/kg.

In addition to the polymeric amine corrosion inhibitor bases of this invention, other ingredients could also be added to the corrosion-inhibiting compositions in order to e.g. improve handling under different climate conditions or to further improve the performance under different conditions. Examples of such ingredients are organic or inorganic acids, such as acetic acid, citric acid, and hydrochloric acid, in which case the amines will be predominantly present as salts; a dispersing or cleaning surfactant, such as nonionic ethylene oxide adducts; water-miscible solvents, such as methanol, ethanol, isopropanol, butanol or glycols such as butyl diglycol, ethylene glycol monobutyl ether, monoethylene glycol; scale inhibitors; biocides, such as alkylbenzyldimethyl ammonium chloride, dialkyldimethyl ammonium chloride, alkylamidopropyldimethylamine oxides or quaternary ammonium salts, e.g. alkylbis(hydroxyethyl)methyl quaternary ammonium chloride; and other corrosion inhibitors, such as other amines, amides, imidazolines or amphoterics.

The products disclosed in the examples in the experimental section, according to the GPC/SEC analysis described below, possess a polymeric nature with a distribution of species with different numbers of connected fatty amine alkoxylates and diacid/acid anhydride residues. This analysis in combination with the fraction analysis using mass spectroscopy reveals that almost all product species have a molecular weight>700 Dalton. In different international regulations products with Mw>700 are considered too large to penetrate biological membranes and thereby bioaccumulate in the feed chain. This is thus an advantage of the products of the present invention from an environmental point of view.

Thus, the products of the present invention should consist for more than 60% w/w of oligomers/polymers with at least two alkoxylated amine units and one or more diacid/acid anhydride units and to >50% w/w of oligomers/polymers with at least two alkoxylated amine units and two or more diacid/acid anhydride units; preferably the products should consist to >75% w/w of oligomers/polymers with at least two alkoxylated amine units and one or more diacid/acid anhydride units and to >65% w/w of oligomers/polymers with at least two alkoxylated amine units and two or more diacid/acid anhydride units, and most preferably the products should consist to >90% w/w of oligomers/polymers with at least two alkoxylated amine units and one or more diacid/acid anhydride units and to >80% w/w of oligomers/polymers with at least two alkoxylated amine units and two or more diacid/acid anhydride units.

EXAMPLES

Molecular Weight Determination

The molecular weights and/or molecular weight ranges given in the examples in the experimental section were determined by the following method:

For separation, a SEC (Size Exclusion Chromatography) column was used. This means that porous particles are used to separate molecules of different sizes, and the molecules with the largest space-filling volume (more strictly, hydrodynamic radius) have the shortest retention times. Thus, in essence, in a SEC system the largest molecules elute first and the smallest molecules elute last. The samples were dissolved in tetrahydrofuran and injected on a GPC/SEC-system (Gel Permeation Chromatography/Size Exclusion Chromatography), and then the fractions collected were analysed by mass spectrometry.

Analytical Description for Molecular Weight Determination of Polymer

The sample was dissolved in tetrahydrofuran and injected on a SEC-system with five columns to separate the different homologues from each other. Each peak was collected as one fraction and the solvent was evaporated. The residue of each fraction was dissolved in ethyl acetate+0.1% acetic acid and injected via direct infusion into the ion trap MS detector. The molecular weights were determined for the different fractions.

Analytical Conditions SEC
Precolumn: Phenogel 5μ linear 50×7.8 mm (Phenomenex)
Columns: Phenogel 5μ 300×7.8 mm, five columns in series with pore sizes $10^4$ Å, $10^3$ Å, 500 Å, 100 Å, 50 Å (Phenomenex)
Mobile phase: Tetrahydrofuran
Flow: 0.8 ml/min
Injection volume: 100 μl
Detector: Refractive Index
Analytical Conditions Mass Spectrometer
Direct infusion via syringe pump into LCQDuo (ThermoFinnigan) Ion Trap with ESI positive mode
Full Scan Mass Range: 150-2,000 m/z

Example 1

The polyester of an ethoxylated amine was synthesised as follows:

Succinic anhydride (75.6 g, 0.76 mole) from DFS Fine Chemicals and Ethomeen T/12 [tallowbis(2-hydroxyethyl)amine] (311.3 g, 0.91 mole) from AkzoNobel Surface Chemistry AB were added to a round-bottomed flask fitted with a condenser, a thermometer, a heating mantle, a nitrogen inlet, and a mechanical stirrer. The reaction mixture was slowly heated to 165±5° C. Water produced during the reaction started to distil off at 151° C. and was removed continuously via ordinary distillation. The reaction was followed by conventional $^1$H-NMR spectroscopy (25° C., in $CDCl_3$, 64 transients, using a Varian® 400 MHz) and acid value titration. After 2 h at 165° C. the acid value of the product had decreased to 0.018 meq/g and the NMR spectrum of the synthesized product showed the reaction to be complete. 272.4 g of the final product were obtained as a brownish liquid. By using the SEC/MS method described above the product was shown to consist for more than 95 of the SEC area-% of oligomers/polymers with two or more alkoxylated amine units and one diacid/acid anhydride unit or two or more alkoxylated amine units and two diacid/acid anhydride units.

Example 2a

The polyester of an ethoxylated amine was synthesised as follows:

Succinic acid (86.2 g, 0.73 mole) from Acros Organics and Ethomeen T/15 [polyoxyethylene(5) tallow amine] (406.0 g, 0.88 mole) from AkzoNobel Surface Chemistry AB were added to a round-bottomed flask fitted with a condenser, a thermometer, a heating mantle, a nitrogen inlet, and a mechanical stirrer. The reaction mixture was slowly heated to 165±2° C. Water produced during the reaction was removed continuously via distillation, first for 4 h at atmospheric pressure and then for 9 h at reduced pressure (18 mbar). The reaction was followed by acid value titration. Once the acid value of the product had decreased to 0.113 meq/g the reaction was stopped. 446 g of the final product were obtained as a brownish liquid. By using the SEC/MS method described above the product was shown to consist >93 SEC area-% of oligomers/polymers with at least two alkoxylated amine units and one diacid/acid anhydride unit or two alkoxylated amine units and two diacid/acid anhydride units.

Example 2b

A polyester polyquaternary amine was synthesised as follows:

In the first step, succinic anhydride (65.1 g, 0.65 mole) from DSM and Ethomeen T/15 [polyoxyethylene(5) tallow amine] (361.4 g, 0.78 mole) from AkzoNobel Surface Chemistry AB were added to a round-bottomed flask fitted with a condenser, a thermometer, a heating mantle, a nitrogen inlet, and a mechanical stirrer. The reaction mixture was slowly heated to 165±2° C. Water produced during the reaction was removed continuously via distillation, first for 1 h at atmospheric pressure and then for 3 h at reduced pressure (21 mbar). The reaction was monitored by acid value titration. Once the acid value of the product had decreased to 0.119 meq/g the reaction was stopped. 403 g of the product from the esterification step were obtained as a brownish liquid.

In the second step, the polyester product obtained above (178.7 g) and the solvent butyl diglycol (BDG; 96.6 g) were added to a stirred autoclave and heated to 59° C. Methyl chloride (15.8 g) was added during a period of 4 minutes. The reaction mixture was then further heated at 72±2° C. for 18 h. When the pressure in the reactor had dropped to 0.9 bar and $^1$H-NMR spectroscopy showed that no unquaternised amine was left, the heating was stopped. The discharged product was a clear viscous liquid containing 34% w/w of BDG.

Example 3

The polyester of an ethoxylated amine was synthesised as follows:

Succinic acid (92.9 g, 0.79 mole) from Acros Organics and Ethomeen O/12 [oleylbis(2-hydroxyethyl)amine] (330.1 g, 0.94 mole) from AkzoNobel Surface Chemistry AB were added to a round-bottomed flask fitted with a condenser, a thermometer, a heating mantle, a nitrogen inlet, and a mechanical stirrer. The reaction mixture was slowly heated to 160±2° C. Water produced during the reaction was removed continuously via distillation, first for 3 h at atmospheric pressure and 160° C., then for 7 h at reduced pressure (24 mbar) and 165° C. The reaction was followed by acid value titration. Once the acid value of the product had decreased to 0.048 meq/g the reaction was stopped. 388 g of the final product were obtained as a brownish liquid. By using the SEC/MS method described above the product was shown to consist >97 area-% of oligomers/polymers with at least two alkoxylated amine units and one diacid/acid anhydride unit or two alkoxylated amine units and two diacid/acid anhydride units.

Example 4

Comparison

The polyester of an ethoxylated amine was synthesized as follows:

Dodecenylsuccinic anhydride (42.0 g, 0.16 mole) from Aldrich (90%), which is a hydrophobic diacid, and Ethomeen T/12 (63.7 g, 0.19 mole) from AkzoNobel Surface Chemistry AB were added to a round-bottomed flask fitted with a condenser, a thermometer, a heating mantle, a nitrogen inlet, and a mechanical stirrer. The reaction mixture was slowly heated to 80±5° C. and stirred for 5 h at 150° C. 100.6 g of a final very viscous product were obtained.

GPC/SEC analysis showed polymer formation in line with Examples 1-3.

Example 5

Corrosion Inhibition Performance in Brine

The tests were carried out using the well-known "bubble test" method, see for instance the discussion in NACE International, Vol. 46, No. 5, pp 46-51 (May 2007), where the corrosion rate is monitored by linear polarisation (LPR). First a baseline corrosion rate in the medium is established, and then corrosion rates with different amounts of inhibitor added are measured.

The detailed conditions for the tests were as follows:
Temperature 55° C.
$CO_2$ $CO_2$ Saturated at ambient pressure (~0.9 bara partial pressure)
Solution 100% Typical "Forties" (North Sea water) synthetic brine as shown below:
  Chloride=42.539 mg/l
  Sulphate=0 mg/l
  Barium=173 mg/l
  Calcium=1.979 mg/l
  Strontium=351 mg/l Magnesium=377 mg/l
Sodium=24.973 mg/l
Potassium=341 mg/l
Bicarbonate=200 mg/l Electrode Fabricated from AISI 1018 (UNS G10180), polished to 600 grit finish, degreased, rinsed, and dried Inhibitor Concentration 4 hour precorrosion without inhibitor, then dose with 10 or 20 mg/kg of inhibitor and evaluate corrosion rate for at least 8 h, then add inhibitor so that the next level of total inhibitor dosage is reached according to Table 1. After each addition the corrosion rate is measured for at least 8 h.

Gas and partial Ambient pressure test. Maximum partial pressure 1 pressure bara (less saturated water vapour pressure at test temperature).

Corrosion Monitoring LPR±10 mV step perturbation with a 2-minute time constant. A Stearn-Geary constant of 25 mV was used to calculate corrosion rates from LPR data. Corrosion rates were monitored throughout each test with a measurement taken every 30 minutes.

Container 1,000 ml electrochemical test cell

Procedure Prepare solution and purge with $CO_2$ until oxygen is less than 10 ppb. Polish electrodes and place them in the electrochemical test cell under a $N_2$ blanket. Transfer the solution into the test cell under $N_2$ blanket. Control the temperature using a proportional controller. Switch gas supply to the required gas mixture. Monitor the corrosion rate for at least 4 hours. Inject neat inhibitor using a micro-pipette and monitor the corrosion rate until stable.

The corrosion inhibitor bases were formulated as follows prior to testing:

40% base product
4% glacial acetic acid
20% n-butanol
36% water

The % protection was calculated from the following equation:

$$\% \text{ protection} = (1 - (x/y)) \cdot 100$$

wherein x=corrosion rate in the presence of corrosion inhibitor (mm/year)

y=corrosion rate in the absence of corrosion inhibitor (mm/year)

TABLE 1

| | % Protection | | | | |
|---|---|---|---|---|---|
| Substance | 10 ppm | 20 ppm | 25 ppm | 50 ppm | 100 ppm |
| Quaternary amine* (comparison) | — | −28.3 | — | 38.0 | 97.7 |
| Product of Example 4 (comparison) | −14.1 | — | 57.6 | 77.0 | 93.5 |
| Product of Example 1 | — | 82.2 | — | 94.4 | 97.5 |
| Product of Example 2a | 89.8 | — | 93.3 | 95.0 | 95.8 |
| Product of Example 3 | 90.4 | — | 91.9 | 92.8 | 93.7 |

Note:
A negative % protection value indicates higher corrosion than the baseline value with no inhibitor added. Ppm equals mg/kg.
*C12-C16 Coco benzyl quaternary amine, standard chemical sometimes used in oilfield corrosion inhibition formulations As can be seen from the results in Table 1, the corrosion inhibitors of the present invention show a very good protection profile and are completely superior to a standard chemical as well as the prior art compound of Example 4 when it comes to dosages used in real-life situations in oil and gas field installations (5-30 mg/kg).

Example 6a

Corrosion Inhibition Performance in Brine/Hydrocarbon

In field use one of the prevailing applications of oilfield corrosion inhibitors is for protection of pipelines where both a water/brine phase and a hydrocarbon phase are transported simultaneously. It is thus of importance that the corrosion inhibitors offer high efficiency under such conditions. One of the preferred compounds of the invention was thus evaluated also in a Bubble test with a hydrocarbon present, a so-called partitioning test.

Partitioning Test Conditions:
  Brine, temperature, stirring, $CO_2$-pressure, coupon, formulation, and measuring method as in standard Bubble test previously described (Example 5).
  Hydrocarbon phase: North Sea crude, 40% or 80% by volume The results are given in Table 2a.

TABLE 2a

| | % brine by | % Protection at various dosages | | | |
|---|---|---|---|---|---|
| Substance | volume | 10 ppm | 25 ppm | 50 ppm | 100 ppm |
| Product of Example 2a | 60 | 93.3 | 98.2 | 99.0 | 99.2 |
| Product of Example 2a | 20 | 92.5 | 96.3 | 97.8 | 98.2 |

These figures demonstrate that the product of the invention gives excellent protection also at very low additions and in a variety of hydrocarbon-water ratios.

Example 6b

Corrosion Inhibition Performance in Brine/Kerosene

Another common laboratory test method for oilfield corrosion inhibitors is to use standard Bubble test conditions but to dose the inhibitor in a model oil phase in order to study how well the active component can transfer to the brine phase and give a good protection of the steel coupon located there. In this particular case 10% of the total volume was kerosene (model oil) while the rest was brine.

Test conditions were as described in Example 5, except for the presence of the kerosene phase (described above), the formulation and the inhibitor concentrations. The product of example 2b was not formulated, just diluted in water to appropriate dosage concentration before it was added to the test cell. Inhibitor concentrations used were 10, 25 and 50 mg/kg.

The results are given in Table 2b.

TABLE 2b

| | % Protection at various dosages | | |
|---|---|---|---|
| Substance | 10 ppm | 25 ppm | 50 ppm |
| Product of Example 2b | 86.6 | 88.5 | 90.8 |

These figures demonstrate that the product of Example 2b manages to transfer to the aqueous phase and give a substantial corrosion protection under typical conditions also at quite low additions.

Example 7

Biodegradability

It is nowadays a well established fact that a reasonable biodegradability often is required by society and authorities for man-made organic compounds that are used in applications where they finally could reach the environment. For certain geographical and/or application areas certain minimum levels of biodegradability are in addition stated by regulatory bodies.

Compounds of the present invention were tested, following GLP standards, on biodegradability in seawater according to OECD Guideline for testing of chemicals, section 3; Degradation and accumulation, No. 306: biodegradability in seawater, Closed Bottle test. The generally good biodegradability of the compounds of the present invention is demonstrated by the following example.

The biodegradation after 28 days for product synthesized in Example 1 was >60%.

The invention claimed is:

1. A method for protecting a metal surface from corrosion by contacting the metal surface with a corrosion-inhibiting product obtainable by a reaction of an alkoxylated fatty amine having the formula

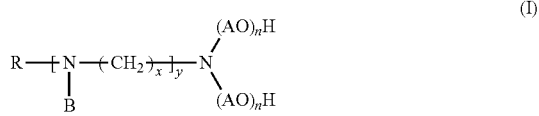

(I)

wherein R is a hydrocarbyl group having 8-24 carbon atoms; B is, independently, an alkyl group having 1-4 carbon atoms, a benzyl group, or the group $(AO)_nH$, wherein each A, independently, is an alkylene group containing 2-4 carbon atoms; each n is, independently, at least 1 and the sum of all n is 2-30; each x, independently, is 2 or 3; and y is 0-3; or a partial or wholly quaternised derivative thereof; with a dicarboxylic acid derivative having the formula

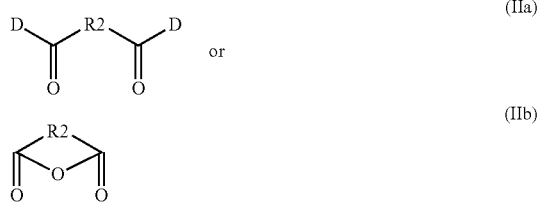

wherein D is —OH, —Cl, or —OR3, wherein R3 is a C1-C4 alkyl group; R2 is selected from the group consisting of a direct bond, an alkylene radical of formula $—(CH_2)_z—$, wherein z is an integer from 1 to 10, a substituted alkylene radical wherein said alkylene radical with formula $—(CH_2)_z—$ is substituted by 1 or 2 —OH groups, the group —CH=CH—, and the o-phenylene group; optionally said reaction between the amine and the dicarboxylic acid derivative is being followed by a further reaction step wherein part or all of the nitrogen atoms are quaternised; and wherein the reaction product consists for more than 60% by weight of oligomers/polymers with two or more alkoxylated amine units, that are optionally quaternized, and one or more diacid/acid anhydride units and for more than 50% by weight of oligomers/polymers with two or more alkoxylated amine units, that are optionally quaternized, and two or more diacid/acid anhydride units; as a corrosion inhibitor for metal surfaces.

2. The method according to claim 1 where the metal surfaces are part of pipelines, pumps, tanks and other equipment.

3. The method according to claim 2 where the corrosion inhibiting product is added to a flowing liquid at any point in a flow line upstream of the point or line that are intended to be protected.

4. The method according to claim 1 where in formula (I) y=0.

5. The method according to claim 1 where in formula (I) y=1, x is 3, and B is an alkyl group having 1-4 carbon atoms, or the benzyl group.

6. The method according to claim 1 where in formula (I) y=1, x is 3, and B is the group $(AO)_nH$.

7. The method according to claim 1 where all nitrogen atoms of the corrosion inhibiting product are tertiary nitrogen atoms.

8. The method according to claim 1 where the dicarboxylic acid derivative has the formula (IIa) and D is OH.

9. The method according to claim 1 where the carboxylic acid derivative has the formula (IIb).

10. The method according to claim 1 where the carboxylic acid derivative is succinic acid or succinic anhydride.

11. The method according to claim 1 where the product is obtained by reaction of a compound of formula (I) with (IIa) or (IIb), and where the reactants are added in a molar ratio of 2:1 to 1:2, preferably 1.5:1 to 1:1.5, and most preferably 1.2:1 to 1:1.2.

12. The method according to claim 1 where the product consists of more than 75% by weight of oligomers/polymers with two or more alkoxylated amine units, that are optionally quaternized, and one or more diacid/acid anhydride units and more than 65% by weight of oligomers/polymers with two or more alkoxylated amine units, that are optionally quaternized, and two or more diacid/acid anhydride units, preferably the product contains for more than 90% by weight of oligomers/polymers with two or more alkoxylated amine units, that are optionally quaternized, and one or more diacid/acid anhydride units and for more than 80% by weight of oligomers/polymers with two or more alkoxylated amine units, that are optionally quaternized, and two or more diacid/acid anhydride units.

* * * * *